(12) United States Patent
Piana et al.

(10) Patent No.: US 12,482,047 B2
(45) Date of Patent: Nov. 25, 2025

(54) SYSTEM AND METHOD FOR DEVELOPING A LAND SCORE FOR A RENEWABLE ENERGY PROJECT

(71) Applicant: BRIGHTNIGHT POWER LLC, West Palm Beach, FL (US)

(72) Inventors: Marco Piana, West Palm Beach, FL (US); Egor Sanin, San Francisco, CA (US); Ben Bourne, Davis, CA (US); Cedric Leroy, Leander, TX (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 18/796,991

(22) Filed: Aug. 7, 2024

(65) Prior Publication Data

US 2025/0111456 A1   Apr. 3, 2025

Related U.S. Application Data

(60) Provisional application No. 63/586,711, filed on Sep. 29, 2023.

(51) Int. Cl.
*G06Q 30/00* (2023.01)
*G06Q 50/16* (2024.01)

(52) U.S. Cl.
CPC .................. *G06Q 50/165* (2013.01)

(58) Field of Classification Search
None
See application file for complete search history.

(56) References Cited

U.S. PATENT DOCUMENTS

| | | | |
|---|---|---|---|
| 2009/0177458 A1* | 7/2009 | Hochart | G06T 17/05 707/999.01 |
| 2010/0138353 A1* | 6/2010 | Srivastava | G06Q 50/165 705/315 |
| 2011/0227417 A1* | 9/2011 | Walker | H02J 3/381 307/72 |
| 2024/0086934 A1* | 3/2024 | Bloom | G06Q 50/06 |
| 2024/0428261 A1* | 12/2024 | Harding | G06Q 50/06 |

OTHER PUBLICATIONS

Debaleena Majumdar, Martin J. Pasqualetti, Analysis of land availability for utility-scale power plants and assessment of solar photovoltaic development in the state of Arizona, USA, Renewable Energy, vol. 134, 2019, pp. 1213-1231, ISSN 0960-1481, https://doi.org/10.1016/j.renene.2018.08.064. (Year: 2019).*

* cited by examiner

*Primary Examiner* — Matthew T Sittner
(74) *Attorney, Agent, or Firm* — FOLEY & LARDNER LLP

(57) ABSTRACT

A method, system, and non-transitory computer readable medium for generating a land score are provided. The method includes receiving a request for a land score calculation from an application on a user device; receiving, from a graphical user interface, a selection of a land site to evaluate; obtaining multiple data inputs relating to the land site; excluding portions of the land site; calculating the land score for the land site; determining, based on the land score, a ranking for the land based on the land score; determining multiple layouts for building based on the ranking; and displaying the layouts via the graphical user interface.

19 Claims, 8 Drawing Sheets

SYSTEM AND METHOD FOR DEVELOPING A LAND SCORE FOR A RENEWABLE ENERGY PROJECT

BACKGROUND

Renewable energy projects, such as solar or wind projects, may rely on the ability to prospect and obtain land sufficient for a particular project at a reasonable cost. For example, decisions may consider a variety of factors, such as energy generation potential of land, amount of earth movement work required to make the land usable, the ability to lease the land, the value of land for purchase, soil characteristics, bedrock depth, and land exclusions. These factors may increase or decrease the value of the land to an energy project.

Current solutions require a detailed and subjective analysis late in the project lifecycle, when, for example, the land has already been made usable, but other factors have not been considered. There are no tools that can provide the economic value of the land for a renewable power project while considering numerous factors, and how these factors may change over time, thus enabling targeting of valuable land for project parameters during the entire project's life cycle, considering both present and future. Current solutions determine land value through a series of processes done by different stakeholders, each of whom may measure different factors based on the context of a specific scope of the stakeholder, such as energy production potential or civil engineering work. The current solutions are error-prone because they rely on multiple sources of data by different stakeholders who may have competing interests. In addition, these methods are based on the time at which the factors were considered and do not account for future variations, and are thus not repeatable or scalable. They are also not usable for different scenarios, i.e., if the land was valued for an energy production potential, those values cannot be used for a civil engineering project.

Selecting the most valuable land to lease or purchase to support a renewable energy project and its specific requirements is important. As a non-limiting example, the most valuable land may be the land that can be used for a renewable energy project when compared with other usable land in the vicinity because it meets specific requirements. Determining valuable land may depend on a rate of return over a project's life cycle and may include considering costs and benefits, as well as potentially disadvantages from conception of the project through the end of the project. In addition, stakeholders may want to consider the value of the land upon completion of the project and any residual value. There are multiple factors to consider before leasing or purchasing land, including minimizing the amount of risk associated with the land as early as possible in the development process. Data driven solutions may help achieve these goals when considering specific project parameters.

Therefore, there is a need for a solution that dynamically leverages cloud computing and geospatial information systems (GIS) to inform decision making for a renewable energy project, such as a solar power project, by providing a land score based on a variety of factors. This may be used from a business development perspective to target specific land for lease or purchase and from an engineering perspective to develop and compare layout options based on the project parameters to optimize the selection and use of the land. The computation may also be used to calculate project construction costs. Additionally, the current solution may be used to generate rasters for analytical project layout optimization and to choose which renewable energy technologies make the most sense for different projects, while considering the cost impacts and the economic benefits.

SUMMARY

In some embodiments, a system for generating a land score is provided. The system may include a memory storing a set of instructions and one or more processors configured to execute the set of instructions to cause the data processing system to perform operations. The operations may include receiving from a user via a graphical user interface (GUI), a selection of a land site to evaluate, wherein the land site includes at least one unit of land; obtaining multiple data inputs relating to the land site; excluding portions of the land site that are not buildable based on the multiple data inputs; calculating the land score for non-excluded portions of the land site based on the multiple data inputs; determining, based on the land score, a ranking for the at least one unit of land based on the land score; determining multiple layouts for building on the non-excluded portions of the land side based on the ranking; and determining multiple layouts for building on the non-excluded portions of the land site based on the ranking; and displaying the layouts of the non-excluded portions as overlays on the landsite via the GUI.

In some embodiments, the above-described system is embodied as a method.

In some embodiments, the above-described system is embodied in a non-transitory computer readable storage medium including code that when executed by a processor, causes the processor to perform the methods described herein.

In some embodiments, one or more devices that are configured or operable to perform the above-described method are disclosed.

The above and other aspects and their implementations are described in greater detail in the drawings, the descriptions, and the claims.

DETAILED DESCRIPTION

Figure 1:
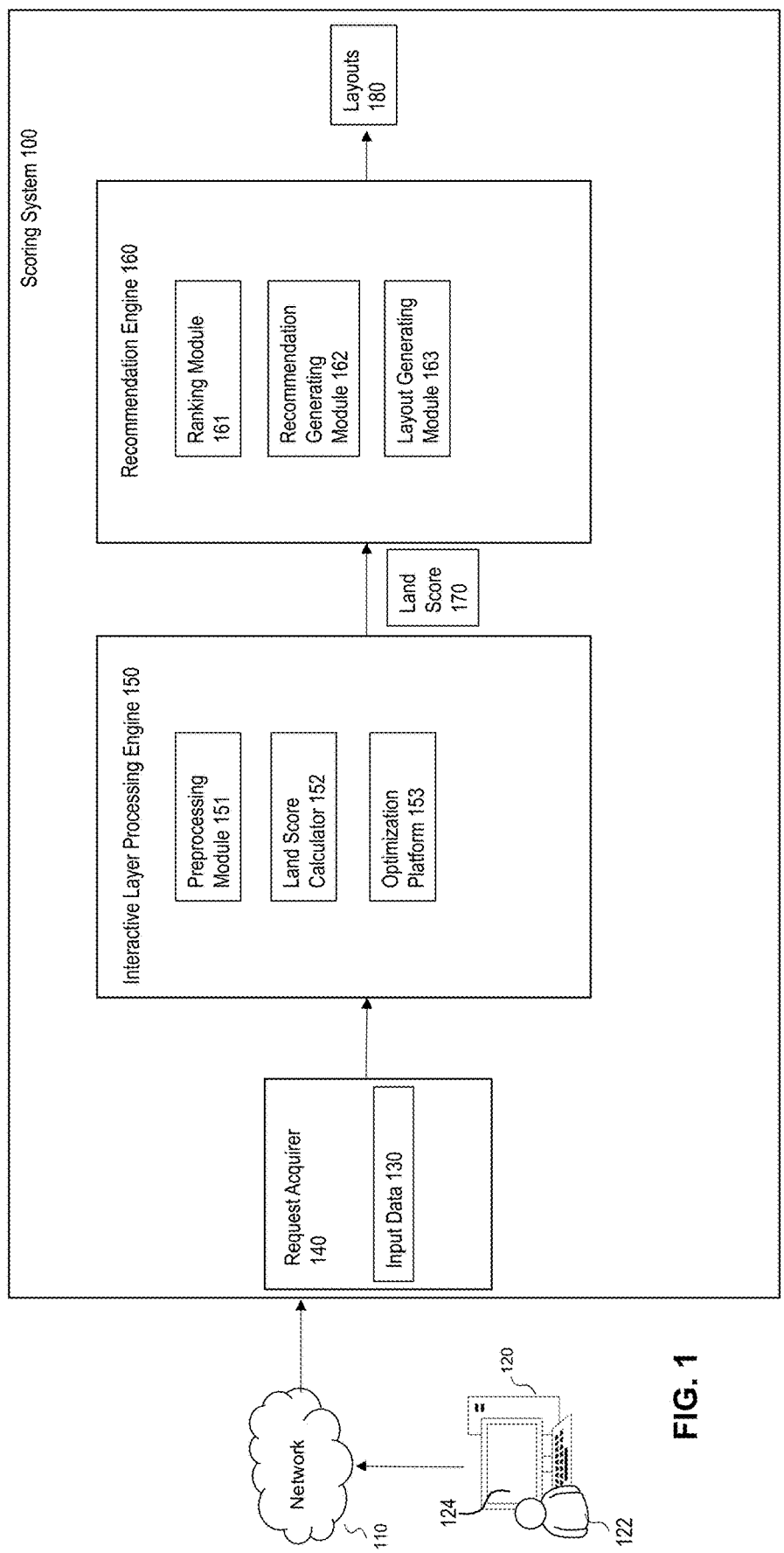
FIG. 1 is a block diagram showing various exemplary components of a land scoring system, according to some embodiments of the present disclosure.

Reference will now be made in detail to exemplary embodiments, examples of which are illustrated in the drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems, and methods consistent with aspects related to subject matter that may be recited in the appended claims.

FIG. 1 is a block diagram showing various exemplary components of a land scoring system, according to some embodiments of the present disclosure. FIG. 1 illustrates an example scoring system 100 for providing a land score based on inputs, consistent with the disclosed embodiments. The land score may represent a net present value (NPV) per unit area of land as an aggregation of component NPVs of various land characteristics. In some embodiments, each unit area of land may be represented by a pixel. A pixel may represent information about a piece of land that has dimensions corresponding to the pixel dimensions of the area of land.

As shown in FIG. 1, scoring system 100 may include a request acquirer 140, interactive layer processing engine 150, and a recommendation engine 160. In some embodiments, scoring system 100 may further include a user device 120. A user 122 may interact with scoring system 100 using a user interface 124.

As shown in FIG. 1, the various components of scoring system 100 may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While scoring system 100 is shown as a network-based environment, it is understood that in some embodiments, one or more aspects of the disclosed systems and methods may also be used in a localized system, with one or more of the components communicating directly with each other.

In some embodiments, request acquirer 140 may receive a request for a land score calculation from the user device 120. Scoring system 100 may represent a system or network environment in which the user 122 may request and receive a land score calculation in real time via the user device 120. In some embodiments, activities of the user 122 may be recorded and stored on a server, such as server 510, described in greater detail with respect to FIG. 5.

User device 120 may include any form of computer-based device or entity through which the user 122 may interact with scoring system 100. For example, the user device 120 may be a personal computer (e.g., a desktop or laptop computer), a mobile device (e.g., a mobile phone or tablet), or any other device that may be capable of accessing web pages or other network locations. In some embodiments, the user device 120 may be a virtual machine (e.g., based on AWS™, Azure™, IBM Cloud™, etc.), a container instance (e.g., Docker™ container, Java™ container, Windows® Server™ container, etc.), or other virtualized instance. User device 120 may be configured such that the user 122 may access system 100 through a browser or other software executing on the user device 120. In some embodiments, the user device 120 may be configured to generate a request for a land score calculation. In some embodiments, the user device 120 may be configured to generate a request for a land score calculation in response to user interaction with the user device 120. In some embodiments, user interaction may include user input to the user device 120. In some embodiments, a request for a land score calculation may include a request to rank the land score calculations for multiple pieces of land.

In some embodiments, the user interface 124 may enable the user 122 to input data to the user device 120. In some embodiments, the user 122 may be an agent that provides a land score calculation to a user. For example, in a service setting, the user 122 may be a customer service agent. The user 122 may also be the customer or user themselves, who has access to scoring system 100.

In some embodiments, the user 122 may input information to the user device 120 via the user interface 124. In some embodiments, information inputted to the user device 120 may be in various formats. In some embodiments, the user interface 124 may be configured to acquire various formats of user input. For example, the user interface 124 may include a keyboard, mouse, and a display such that the user 122 may type information via a keyboard in a designated area on the display or draw information using the mouse. Activities of the user 122 may include taking notes on the user interface 124 in real-time. In some embodiments, the user interface may allow a user to view a basemap of a specific area of land. In some embodiments, a basemap may serve as a reference map on which a user may overlay data from layers to visualize geographic information related to a specific area of land. An individual basemap may be made of multiple features, rasters, or web layers. In some embodiments, a user may set a default basemap based on a specific area of land. In other embodiments, a user may create a custom basemap to define background layers of the map. In some embodiments, layers may refer to collections of geographic data. In some embodiments, a layer may be automatically added to a basemap. In other embodiments, a layer may be manually added to a map by a user. In some embodiments, the layers may include terrain information; structural information; power line information; transmission infrastructure information; the potential layout or arrangement of solar panels; environmental information, including floodplains, wetlands, and water features; vegetation information; and soil type information.

The user may also interact with, for example, a map displayed on the user interface 124 to draw shapes on areas of interest to the user on the map. The user may draw on the map in real time. In some embodiments, the user may use spatial queries to select spatial features on the map. In some embodiments, spatial features may refer to location or spatial information that helps determine natural or artificial boundaries or shapes to visualize spatial data. In some embodiments, a spatial query may be used to append new spatial features on the map. In some embodiments, a user may use a spatial filter on the map. In some embodiments, a spatial filter may be a layer on the map. In some embodiments, spatial filters may be used to alter properties to remove certain information or add certain information to the map. In some embodiments, a user may use a geoprocessing tool to filter data or include more data.

In some embodiments, notes that the user 122 takes on the user device 120 may be recorded to provide an accurate record of all notes associated with a particular user. The recording, transmission, and storage of the recorded notes may be performed in a secure manner, such that only qualified personnel or devices such as the user device 120 may access the recorded information.

According to some embodiments, request acquirer 140 may acquire input data from multiple sources. In some embodiments, request acquirer 140 may acquire input data 130 from the user device 120, e.g., via a browser or a browser plug-in. In some embodiments, the input data 130 may include input data that the user device 120 acquires from the user 122. In some embodiments, when request acquirer 140 receives the input data 130, e.g., which is pushed from the user device 120, request acquirer 140 may consider such data push a request for a land score calculation.

The input data 130 may include design parameters for a particular energy project, digital cadastral and title records of land, or various GIS layers that quantify land characteristics. For example, title records of land may include parcels, lease agreements, purchase costs, land owners, land jurisdiction, and any other information related to the land. Multiple land characteristics may be evaluated. Examples of land characteristics may include: topography and land slopes, vegetation coverage, real estate costs, soil conditions including depth of bedrock, environmental conditions, and hydrology. Land characteristics may be represented by GIS objects, including rasters composed by pixels that represent the unit areas of land which are the smallest units of information that are used in the land score analysis. Pixels may vary in size based on the specific land characteristic and resolution of analysis that the land score process aims to achieve.

Multiple sub-scores may be calculated using land characteristics. Examples of sub-scores may include: energy sub-score, grading sub-score, pile sub-score, vegetation removal and management sub-score, real estate costs sub-score, and environmental mitigation sub-score. Sub-scores may be calculated for each unit area of land (pixel, see FIG. 2 and definitions) using at least one land characteristic.

As an example on how a sub-score is created, consider the land characteristic "vegetation coverage" as one of the inputs used to calculate the sub-score "vegetation removal." For each unit area of land, the scoring system assesses if in the specific unit area of land vegetation removal is needed and the life cycle costs (i.e., cost of vegetation removal), benefits (i.e., selling value of timber), and other parameters such as, but not limited to, risk adjustment factors (i.e., contingency due to unclear environmental restrictions that may not allow the use of motorized equipment). The scoring system includes the life cycle costs and benefits and generates the "vegetation removal" sub-score for each unit area of land. The "vegetation removal" sub-score may be identified as a net present value (NPV). Each unit area of land may have its own "vegetation removal" sub-score that may be stored in the attribute of a pixel. Pixels may be aggregated into a "vegetation removal" sub-score GIS raster that covers the portion of land indicated by the user. In summary, each unit area of land (graphically identified by a pixel) has its own "vegetation removal" sub-score and all individual scores may be aggregated in the "vegetation removal" sub-score GIS raster.

At least one sub-score is used in the land scoring analysis. Multiple sub-scores may be used, and each sub-score may be represented with a separate GIS raster. The land scoring system may elaborate multiple sub-scores and generate, for each unit area of the project, a land score that may be stored in the attributes of the corresponding pixel in the land score GIS raster.

The land score may be created using multiple sub-scores. For a specific land site, the land scoring system calculates the following three sub-scores: "vegetation removal," "energy production," and "real estate." Each sub-score may be identified by a sub-score raster which each pixel stores the specific sub-score for its corresponding unit area of land. For each unit of land, the land scoring system aggregates the three sub-scores calculated for that same unit of land and calculates the land score that may be stored in the pixel to be aggregated into the land score GIS raster.

The GIS rasters representing sub-scores (e.g., "vegetation removal" sub-score raster, "energy production" sub-score raster, "real estate" sub-score raster) and the GIS raster representing the land score may be overlaid with other GIS features such as, but not limited to, layout of the renewable project.

The GIS layers may include freely available, commercially procured, or proprietary GIS layers. GIS layers may be used to inform decision making. For example, a GIS layer may be used on top of a map, such as a basemap, as described previously, as a secondary layer that uses topography to determine information about the land. The resolution of a GIS layer may be made more or less precise depending on design constraints.

In some embodiments, the input data 130 may be related to a specific user or a specific portion of land. In some embodiments, request acquirer 140 acquires the input data 130 in real-time. The input data 130 may be received from various sources accessed via the network 110, such as geological surveys, proprietary vendor data, geotechnology studies, LiDAR point clouds, and any other similar information.

According to some embodiments, an interactive layer processing engine 150 may include a preprocessing module 151, a land score calculator 152, and an optimization platform 153.

In some embodiments, the output of the one or more algorithms associated with the optimization platform 153 may be geospatial vector data. In some embodiments, this data may represent the location and shape of inverter blocks and subcomponents, such as module tables, inverters, service roads, etc., in a physical space on a unit of land. In some embodiments, to determine the score of a layout, the algorithm may use metrics derived from land scoring, consistent with disclosed embodiments. In some embodiments, the optimization platform 153 may superimpose the geospatial vector data onto the land score. This superimposing may account for factors including energy yield, suitability of land for solar panel installation, proximity of the layout for existing infrastructure, and any environmental or regulatory considerations. In some embodiments, the output of the one or more algorithms associated with the optimization platform 153 may be monetary costs or energy production associated with a particular layout. In some embodiments, such output would involve a determination of capital and operational expenses of the layout and an estimate of energy production for the layout over the course of the layout's lifetime.

The interactive layer processing engine 150 may accept a variety of inputs, such as the input data 130 and allow for a user to interact with system 100 to alter the behavior of the engine.

In some embodiments, the interactive layer processing engine 150 may receive the input data 130 from request acquirer 140. The data may be in an unstructured format or a structured format. In some embodiments, the interactive layer processing engine 150 may pre-process the input data 130 using the preprocessing module 151. In some embodiments, the preprocessing module 151 may perform one or more pre-processing algorithms on the input data 130 such that the input data 130 may be recognized.

In some embodiments, the preprocessing module 151 may remove punctuation from the input data 130. In some embodiments, the preprocessing module 151 may perform tokenization on the input data 130. Tokenization separates text into units such as sentences or words. In some embodiments, the preprocessing module 151 may remove stop words from the input data 130. For example, the preprocessing module 151 may remove common words such as "a, the, and" from the input data 130. In some embodiments, the preprocessing module 151 may perform stemming. Stemming may reduce a word to stem form by removing suffixes using a rule-based approach. Stemming may also treat words with the same stem as synonyms. In some embodiments, the preprocessing module 151 may lemmatize the input data 130 by deriving the root form of the word. In some embodiments, the preprocessing module 151 may vectorize the input data 130, which encodes text as integers to create feature vectors so that algorithms can understand language.

In some embodiments, the preprocessing module 151 may convert a map or raster from one projected coordinate system to another. In some embodiments, such projection may be used to integrate maps from two or more projected coordinate systems. In some embodiments, the preprocessing module 151 may reproject a feature layer in a map based on an updated dataset. In some embodiments, the preprocessing module 151 may resample rasters. In some embodiments, resampling may change the raster pixel size or a resampling type. For example, before combining and analyzing rasters with different resolutions or map projections, the data may be resampled to a common resolution and projection. In some embodiments, the preprocessing module 151 may perform normalization to ensure data comparability. In some embodiments, the preprocessing module 151 may perform geometry correction. In some embodiments, the preprocessing module 151 may inspect features of the data or the rasters for issues with geometry and repair the issue. In some embodiments, the preprocessing module 151 may perform topology corrections.

According to some embodiments of the present disclosure, once the input data 130 is pre-processed by the preprocessing module 151, the land score calculator 152 may generate a land score calculation based on the input data. The land score calculator 152 is described further with respect to FIG. 2.

In some embodiments, the interactive layer processing engine 150 may also include the optimization platform 153 to help calculate the land score from the input data 130. In some embodiments, an algorithm(s) of the optimization platform 153 may use predetermined rules.

In some embodiments, the optimization platform 153 may be configured to determine layouts as described herein based on a number of factors. The optimization platform 153 may utilize one or more algorithms to construct layouts for solar panels. The factors may include design characteristics, mounting structure characteristics, and module dimensions related to the layouts of solar panels. Examples of design characteristics may include at least one of ground coverage ratio, inverter loading ratio, and DC/AC ratio. In some embodiments, ground coverage ratio may refer to the ratio of an area of land covered by solar panels to the total area of land of a site. The ground coverage ratio may be used to compare different layout designs during the initial design phase. In some embodiments, the inverter loading ratio may refer to the DC-to-AC ratio. In some embodiments, this may be the ratio of installed DC capacity to the inverter's AC power rating.

In some embodiments, the mounting structure options may include a single axis tracker, fixed tilt, and east-west configurations. In some embodiments, a single axis tracker may allow the movement of a photovoltaic (PV) panel in one direction, from east to west, to follow the sun's path from sunrise to sunset. In some embodiments, using a single axis tracker may allow an increase in the collection of solar energy throughout the day. In some embodiments, a fixed tilt mounting structure may use two separate angles that determine the orientation of PV panels relative to the sun. In some embodiments, fixed tilt systems may require less installation and maintenance fees but may produce less solar energy over time. In some embodiments, single axis tracker systems may produce more solar energy over time but may require higher maintenance and installation costs. In some embodiments, PV panels may be positioned with one side of the installation facing towards the east and the other side of the installation facing towards the west.

In some embodiments, the solar panels may be arranged in rows or columns. In some embodiments, the optimization platform 153 may account for the dimension and orientation of the panels when configuring layouts, such as layouts 180, described herein. In some embodiments, the optimization platform 153 may use inverter blocks on the land site to determine an optimal layout. An inverter block may refer to an inverter and its associated DC capacity. In some embodiments, the optimization platform 153 may use the inverter blocks by starting at a specific location and continuing across a land site until a desired capacity is reached to determine the layouts 180 for a land site. In some embodiments, the optimization n platform 153 may use variations in the inverter loading ratio to determine an optimal layout. In this way, the optimization platform 153 may account for whether certain blocks are limited in capacity based on non-buildable areas or areas that may reduce the amount of DC capacity that can be deployed. In some embodiments, the user 122 may define the flexibility allowed for the inverter loading ratio.

In some embodiments, the optimization platform 153 may follow best practices for solar panel layouts by arranging the panels in a compact manner. In some embodiments, the optimization platform 153 may be further configured to provide the layouts 180 by arranging the solar panels in a compact manner, while allowing room for equipment or service roads. In some embodiments, layouts 180 may avoid scattering the panel layouts and ensure they are close together, consistent with industry standards and installation techniques. The layout generating module 163 may use the design parameters recommended by the recommendation generating module 162 and the optimization platform 153 to create layouts 180. As a non-limiting example, the layouts 180 may refer to solar layouts. A solar layout may include a drawing showing the main components of a power project such as, but not limited to, solar panels, trackers, inverters, DC and AC cables, combiner boxes, roads, and fences. The layout may be generated using the recommendations generated by the recommendation generating module 162 and the layout generating module 163. For example, the layouts 180 may reflect spacing between trackers, a ratio between DC power of solar panels and AC power at the interconnection of panels, and any other relevant parameters for generating a layout for solar panels. Layouts 180 may also include geospatial vector data. In some embodiments, geospatial vector data may represent the location and shape of the inverter blocks, solar panels, service roads, and other equipment related to the layout for the solar panels.

In some embodiments, the recommendation generating module 162 and the optimization platform 153 may create potential layouts, which may be randomly positioned on the available land site. In some embodiments, creating random positions on the land site allows algorithms to begin searching for an optimal layout. In some embodiments, a layout may be assessed or evaluated based on how well it performs according to a fitness function to maximize energy production while minimizing costs. In some embodiments, the algorithm may use the fitness function to compare and contrast different layouts. In some embodiments, the potential layouts may be improved by updating and adjusting the layouts. In some embodiments, modifications may be made to the layouts based on the performance of certain layouts. In some embodiments, better performing layouts, based on at least one of energy production or minimal costs, are chosen to create new layouts. In some embodiments, iterations of developing new layouts may occur until an optimal layout is determined.

According to some embodiments of the present disclosure, a recommendation engine 160 may include a ranking module 161, a recommendation generating module 162, and a layout generating module 163. The ranking module 161 may rank land scores 170 based on the input data 130 and any design parameters. The ranking module 161 may also rank the land scores 170 based on preconfigured rules. In some embodiments, the land score may be a number that represents the land score. In some embodiments, the land score may be a monetary amount that indicates the costs of developing a particular land site with solar panels. The recommendation generating module 162 may generate one or more recommendations related to the land scores 170. In some embodiments, the recommendation generating module 162 may output the one or more recommendations to an interactive dashboard. In some embodiments, the recommendation generating module 162 may output a sensitivity analysis or report that evaluates the performance of solar cells with respect to certain parameters, such as energy production. For example, the recommendation generating module 162 may recommend one specific land site for a renewable energy project. For example, the recommendation generating module 162 may recommend a specific layout of solar panels for a solar power project or a specific layout for a wind farm project, as further described with respect to FIGS. 7A and 7B. In other embodiments, the recommendation generating module 162 may generate a recommendation for a specific solar mounting technology, or other recommendations related to hardware for a particular project. In some embodiments, the recommendation generating module 162 may recommend avoiding particular areas of land where soil conditions could increase the costs of building a foundation. In some embodiments, the recommendation generating module 162 may recommend purchasing a piece of land or leasing a piece of land. In some embodiments, the recommendation generating module 162 may make recommendations regarding vegetation, wildlife habitats, or slope to accommodate for project parameters, as further described with respect to FIG. 2. The recommendation generating module 162 may also provide recommendations about taking advantage of a piece of land to increase various component scores, such as the land score 170. For example, the recommendation generating module 162 may provide recommendations about using a neighboring parcel of land to mitigate environmental impacts. The recommendation generating module 162 may also provide cost benefit analyses based on the scores. For example, the recommendation generating module 162 may recommend building on a piece of land that is less desirable from a civil engineering perspective because that piece of land is close to the point of interconnection. The recommendation generating module 162 may also recommend a value for a piece of land based on the land score calculations. This may be used, for example, in negotiating between land buyers and sellers.

Figure 2:
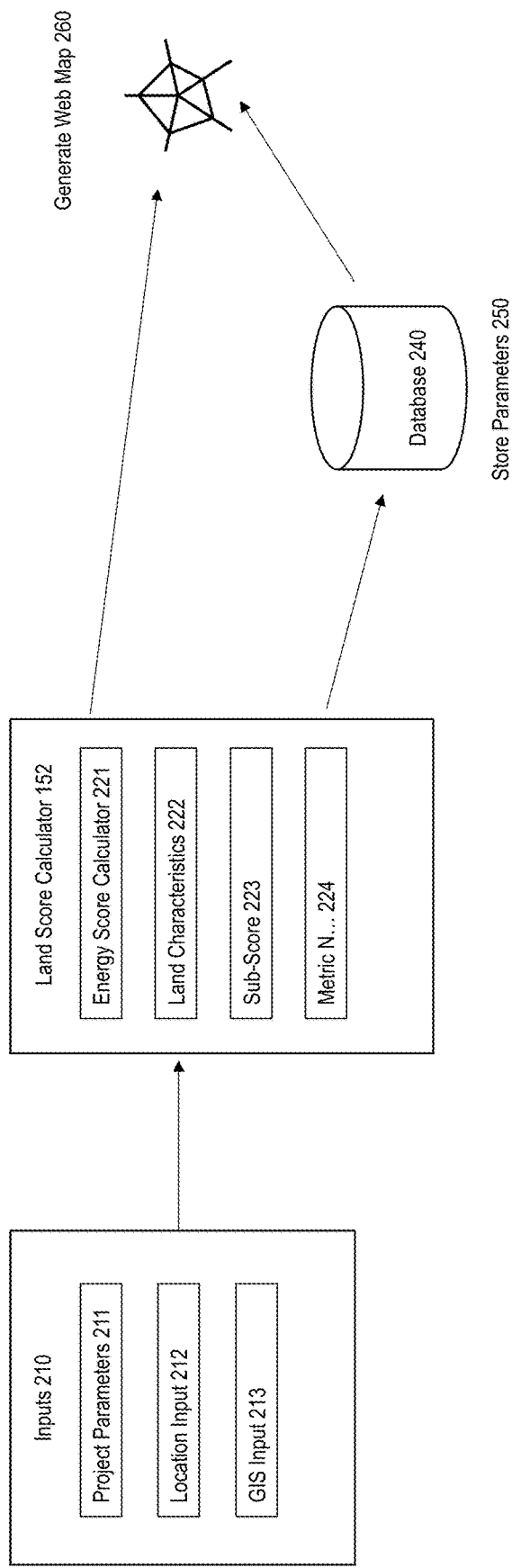
FIG. 2 is a block diagram of a land score calculator, according to some embodiments of the present disclosure.

FIG. 2 is a block diagram of a land score calculator 152, according to some embodiments of the present disclosure. The land score calculator 152 may take inputs 210. The inputs 210 may include project parameters 211, a location input 212, and a GIS input 213. The inputs 210 may include a project parameters 211, a location input 212, and a GIS input 213. The location input 212 may be input by a user on an aerial image, such as the user 122 on a user interface, such as user interface 124, as described with respect to FIG. 1. The location input 212 may include one or more land plots or areas. Once the location input 212 is determined, the GIS input 213 may be determined. The GIS input 213 may be overlaid over the location input 212.

The inputs 210 may also include information related to amount of depth to bedrock, a flood hazard, wetland information, hydrography information, a slope of land, transmission infrastructure, distribution infrastructure, weather data, soil characteristics, residential real estate infrastructure, commercial real estate infrastructure, vegetation surveys, environmental surveys, or wildlife habitats. Depth to bedrock may refer to the depth from the earth's surface to a bedrock layer. Bedrock may refer to the hard, solid rock found beneath the earth's surface. A flood hazard may refer to areas that are susceptible to flooding based on special flood, mudflow, or flood-related erosion hazards. Wetland information may refer to data related to wetland ecosystems, such as the type of water, vegetation, soil, or hydrology. Hydrography information may refer to information related to physical features of bodies of water. Slope may refer to the amount of vertical rise or the angle of a slope relative to the ground or structure it is installed on. Transmission infrastructure may refer to the structures that are used to process large amounts of electricity or energy produced by solar panels and the infrastructure used to transport the energy to consumers for use. Distribution infrastructure may refer to the structures and equipment needed to distribute the energy produced by solar panels to consumers for use. Weather data may refer to information related to tracking and predicting weather conditions and patterns. Weather data may include the measurement of different parameters, such as temperature, air quality, wind speed, or precipitation level. Soil characteristics may refer to information about soil including, but not limited to, texture, color, depth, structure, porosity, or stone content. Residential real estate infrastructure may refer to the facilities, installation, and equipment needed to install solar panels on residential real estate. Commercial real estate infrastructure may refer to the facilities, installation, and equipment needed to install solar panels on commercial real estate. Real estate infrastructure may also consider tax implications, legal implications, and local regulatory laws. Vegetation surveys may refer to the process of collecting data about plant life in a particular area for impact assessment and planning for a specific area of land. An environmental survey may refer to assessing the condition of environmental resources and the environmental impact for a specific area of land. Wildlife habitat information may refer to the resource and factors in an area that support the survival of particular species.

The land score calculator 152 may include an energy score calculator 221 (further described with reference to FIG. 3), land characteristics 222, a sub-score 223, and any other metrics, as indicated by a metric 224 in FIG. 2. The calculation derived from the land score calculator 152 may then be used to generate a web map 260. In the alternative, land score calculator 152 may store parameters 250 in a database, such as a database 240. The land score calculator 152 may also be run on the cloud or a cloud computing platform. Examples of cloud computing platforms include, but are not limited to, Microsoft Azure®, Amazon Web Services™, Google Cloud® platform, IBM® cloud, or similar systems.

The land score may represent a net present value (NPV) per unit area of land as an aggregation of component NPVs of various land characteristics, such as the land characteristics 222. In some embodiments, the layout score may be an application of the land score. For example, the layout score may be based on the land score, and used to determine rankings of different layouts based on input data, consistent with disclosed embodiments.

The land characteristics 222 may include, but are not limited to, topography, land slopes, vegetation coverage, real estate costs, soil conditions, environmental conditions, and hydrology information. Land characteristics may be represented by GIS objects, such as rasters. In some embodiments, rasters may comprise pixels that represent the unit area of land. Pixels may be the smallest unit of information used in the land score analysis. Pixels may vary in size based on the land characteristics 222. Pixels may also vary in size based on the resolution of analysis that the land score process aims to achieve.

The sub-score 223 may include additional scores such as, but not limited to, an environmental score, a pile and grading optimization score, a pile pre-drill score, a soil corrosivity score, a soil characteristic score, a vegetation removal score, a vegetation management score, a civil cost score, a real estate score, a hydrology score, a PV panel soiling score, a storm water management score, and an interconnection proximity score. In some embodiments, the environmental score may include factors such as protected species on an area of land, local regulations for the land, air temperature, humidity, air pressure, and any other relevant environmental factors.

In some embodiments, the pile and grading optimization score may be given for a terrain profile for a specific land area and may be from a specific topographical layer and based on tracker specifications. A tracker may be a mechanical device that rotates solar panels so they capture the greatest amount of available solar energy. Trackers may be installed in the ground, with the solar panels installed on the trackers. A tracker specification may provide details about the operating range of a solar panel in terms of angle, dimensionality, and operating costs. The pile and grading optimization score may estimate pile lengths and grading costs. Grading may refer to reshaping earth and soil so that the final slopes of the land do not exceed the slopes compatible with the tracker's tolerance and any other considerations related to constructability. In some embodiments, a tracker may refer to a device that allows solar panels to follow the sun's path in the sky. In some embodiments, a tracker may be coupled with a solar panel to follow the path of the sun. The grading process may involve digging up a selected area and moving the dirt from one location to another, such as moving dirt from a high section of the land to a lower region. This operation is often referred to as "cut and fill." Piles may refer to the foundations supporting the trackers. Piles are typically cantilevered steel columns embedded into the soil and with an above-ground reveal needed to accommodate a racking structure. The pile and grading optimization score may be evaluated concurrently since the implemented grading affects the length of the piles, as well as the cost of maintaining the piles. For example, a more extensive grading may require larger volumes of earth to be excavated and hauled (increasing grading cost) but may result in a reduction of the pile lengths (reducing pile costs). The pile and grading optimization score may be used to optimize grading or earth movement to implement specific design parameters for a project. In some embodiments, calculating the pile and grading optimization scores may be an iterative process between grading and pile lengths. In some embodiments, the pile lengths may determine the quantity of materials required for the project's foundations, since it determines the number, length, and type of piles. The technical characteristics of the trackers may impact the grading and pile design requirements so the comparison of different tracker models may result in different pile and grading scores. The final grading of the project may also have an impact on energy production because the solar panels will have different energy production levels based on their tilt. The tilt of the panels may be affected by the slope of the terrain. Land scoring may allow stakeholders to identify the optimal solution to concurrently evaluate grading and pile costs with energy production impacts for multiple land sites In some embodiments, the pile pre-drill score may be calculated using a depth of bed rock based on the GIS information. In some embodiments, the pre-drill score may also incorporate the estimated costs of drilling.

In some embodiments, the soil corrosivity score may refer to the chemical corrosion by soil. In some embodiments, it is a geologic hazard that affects buried metals or concrete in direct contact with soil or bedrock. A soil corrosivity score may determine that certain land is unusable based on project parameters. In some embodiments, this score may also be used to estimate the costs of materials. In some embodiments, the soil corrosivity score may consider depth to bedrock information. In some embodiments, the score may be calculated using geospatial or financial information or both geospatial and financial information. In some embodiments, the geospatial input data may be publicly available data from the United States Geological Survey. In some embodiments, the geospatial input data may be geotechnical report information, such as a depth to bedrock limit value. In some embodiments, the financial input data may be the pre-drill costs associated with the bedrock. In some embodiments, the soil corrosivity score may be output as a dollar amount per acre. In some embodiments, based on the depth to bedrock information, pre-drilling may be required, which may trigger an additional cost associated with a project. For example, if the depth to bedrock value if less than seven feet, drilling may be required.

In some embodiments, the soil characteristics score may take into account a soil type and pile sizes. In some embodiments, the soil characteristics score may be calculated using geospatial or financial information or both geospatial and financial information. In some embodiments, the geospatial input data may be publicly available information, such as topography information, GIS topography information, United States Geological Survey (USGS) topography information, or survey site soil conditions. In some embodiments, the soil characteristics score may be further calculated based on racking specifications of solar panels. The racking specifications may include, but are not limited to, the length of the racks, the number of piles, and the terrain following capacity for the solar panels. In some embodiments, grading tolerances may also be used in calculating the soil characteristics score. In some embodiments, the grading tolerance may include a maximum north-south slope, a maximum east-west slope, a maximum design tolerance, a maximum pile reveal, a minimum pile reveal, and a maximum slope for which it becomes unacceptable to use the land, and thus the land is excluded from the calculation. In some embodiments, the financial input data may include an internal cost for grading the soil, which may include a cost per cubic yard for cut soil, fill soil, imported soil, exported soil, and haul soil. In some embodiments, cut soil may refer to earth that has been removed from an area. In some embodiments, fill soil may refer to soil that is used to fill empty spaces, raise elevations, or create a stable base. In some embodiments, imported soil may refer to soil that is brought on to a land site from outside of the land site limits for use in a project. In some embodiments, exported soil may refer to soil that is removed from a land site. In some embodiments, the soil characteristics score may be output as a raster or polygon to show each area of a land site based on the cut or fill volume. In some embodiments, the output may also identify areas of a land site that should be excluded due to excessive slope. In some embodiments, the output may reflect grading costs, foundation pile costs, and construction productivity costs related slopes in either rasters or polygons as a price per acre.

In some embodiments, where a slope exceeds an unacceptable slope, the area may be identified as to be excluded. In some embodiments, the soil characteristics score may employ an algorithm or combination of algorithms to conduct a grading analysis. In some embodiments, the grading may maintain slopes within the acceptable slopes as defined by inputs to the calculation. In some embodiments, an analysis of the soil characteristics score may include modifications to design grading tolerance and the maximum pile reveal. In some embodiments, a construction productivity cost may be calculated based on terrain slope. In some embodiments, the output may provide an optimal cost for grading soil versus the costs of a foundation pile to build a solar panel. In some embodiments, the output may further consider grading costs for specific racking technologies, which may allow stakeholders to consider multiple options for different racking technologies to select an optimal racking system for a project.

In some embodiments, the vegetation removal score may use a tree canopy GIS layer. Vegetation mitigation may include selective herbicides and growth regulators for certain vegetation to control tall weeds and grasses and promote the growth of low growing grasses. Vegetation mitigation may also include considering invasive species, tilling the land, mowing the land, removal of vegetation, and establishment of new vegetation. The costs of vegetation mitigation may also be factored into the vegetation mitigation score. In some embodiments, the vegetation removal score may use inputs that are both geospatial and financial. In some embodiments, the vegetation removal score may use only one of geospatial or financial inputs. In some embodiments, the geospatial inputs may include publicly available data, such as United States Forest Service (USFS) tree canopy cover data sets and tree maps. In some embodiments, geospatial inputs may also include topography reports. In some embodiments, topography report information may include LiDAR information or site survey information. In some embodiments, the financial inputs may include information about the costs of vegetation removal, include the costs of tree removal. The financial inputs may be based on units of land, such as the cost per acre for vegetation removal. In some embodiments, the financial inputs may also consider additional costs, such as the costs of timber removal or de-stumping of trees. In some embodiments, the output of the vegetation removal score may be a removal cost per unit area of land. In some embodiments, when a user or stakeholder considers vegetation removal, they may consider the height of the vegetation, the additional costs, such as de-stumping, and whether an area is clear of vegetation.

In some embodiments, the vegetation management score may be used to consider environmental mitigation considerations. For example, the vegetation management score may take as input data from environmental consultations on biological and cultural mitigation factors. The vegetation management score may also take as input data financial information related to a project specific cost for each acre to manage vegetation.

The land characteristics may also include an exclusion score. The exclusion score may be used to inform a user whether a piece of land in an area of interest may be used for a particular project. This may be based on, for example, the project parameters. The exclusion score may consider factors such as floodplains, fire code setbacks, civil requirements for a minimum area, a clearance, distance between panels, or other project pieces that may be used to calculate a set of acreage values available for building the project. In some embodiments, these calculated values may be written to object fields. In some embodiments, the civil cost score may be dependent on the shape of the land and the location. For example, if fencing is needed, this may be incorporated into the civil cost score.

In some embodiments, the real estate score may be calculated to determine real estate costs associated with a land site. In some embodiments, the real estate score may be calculated using inputs based on geospatial information, financial information or both geospatial and financial information. In some embodiments, the geospatial input information may include land lease information, such as upfront costs, a minimum amount of a leased area, and annual cost for leasing an area of land. In other embodiments, the geospatial input information may include land purchase information, such as upfront costs, a minimum amount of acreage to be purchased, and the cost to purchase the land. In some embodiments, the financial input information may include a calculation of costs to develop solar on the land. In some embodiments, the output of the real estate score may include a real estate cost output as rasters or polygons showing a cost per acre for a land site. In some embodiments, the output may reflect a lease cost, a purchase cost, or both a lease cost and a purchase cost.

In some embodiments, the hydrology score may be calculated to determine water flow throughout a land site. In some embodiments, the hydrology score may be calculated using inputs based on geospatial information, financial information or both geospatial and financial information. In some embodiments, the geospatial input information may be publicly available information, such as USGS topography information or Federal Emergency Management Agency (FEMA) maps. In some embodiments, the geospatial input information may include hydrology model information, such as two-dimensional models or inundations maps, which may show velocity and depth information related to water flow. In some embodiments, the inundation map may be created using software or through algorithms integrated within the land score calculator. In some embodiments, the hydrology model information may be pre-development hydrology models or post-development hydrology models. In some embodiments, the financial input information may include a cost database or calculation information related to capital costs and operational costs of operating solar panels within the land site. In some embodiments, the output of the hydrology score may include areas to be excluded based on stormwater flows. The costs may appear as rasters or polygons as a price per acre. In some embodiments, the FEMA maps may be used to identify flooded areas. In some embodiments, flooded areas may be excluded from buildable areas. In other embodiments, if areas within a flooded area can be used, a pile length may be calculated to counteract the flood depth in a particular area. In some embodiments, areas may be excluded if the ground water velocity exceeds a maximum acceptable velocity, if a depth exceeds an acceptable depth, or if a scour depth exceeds an acceptable scour depth. In some embodiments, the hydrology score may be used to identify areas to be excluded or to calculate additional costs associated with a project, such as when pile lengths need to be incorporated into a land site.

In some embodiments, the PV panel soiling score may be used to determine soil mechanical characteristics. In some embodiments, the PV panel soiling score may be calculated using inputs based on geospatial information, financial information or both geospatial and financial information. In some embodiments, the geospatial input information may be publicly available information regarding soil characteristics from a USGS database or a geotechnical report. In some embodiments, the financial input information may include the costs per pound of material to create a pile or the cost per foot of the pile. In some embodiments, the output of the PV panel soiling score may include a foundation pile cost associated with the soil, and may be shown in rasters or polygons as a price per acre. In some embodiments, foundation piles for a specific area of land may be designed using software or algorithms. In some embodiments, algorithms may be used to calculate a minimum pile embedment, which may be the total length of a pile. In some embodiments, algorithms may also be used to calculate a minimum pile type and size.

In some embodiments, the storm water management score may be used to determine storm water management considerations. In some embodiments, the storm water management score may be calculated using inputs based on geospatial information, financial information or both geospatial and financial information. In some embodiments, the geospatial input information may be two-dimensional models and inundation maps as described with respect to the hydrology score. In some embodiments, the financial input information may include capital costs and operational costs. In some embodiments, the output of the storm water management score may include an area to be allocated for drainage infrastructure, such as basis. In some embodiments, the output of the storm water management score may be a cost associated with the storm water management and may include a cost per acre. In some embodiments, the storm water management score may be sued to determine a volume of a basin to minimize runoff and mitigate erosion.

In some embodiments, the interconnection proximity score may refer to an evaluation of an area of interest with respect to the proximity of electrical substations or other types of interconnections that allow energy to flow from the generation of the energy source to the point of use.

The land characteristics may also include a project layout optimizer for laying photovoltaic (PV) modules on a given land area in the most economical way. A PV module may consist of PV cells wired in parallel to create a panel. The module may be encapsulated in a tempered glass with a waterproof material on the back surface. The layout optimizer may consider any of the above land characteristics in determining an optimal layout.

The land score may include a georeferenced grid of values, known as a raster, for each of the factors considered in the calculation of the land score. The land score may also include the sub-score(s) 223. The raster may include a matrix of cells or pixels, arranged in rows and columns. Each cell or pixel may contain two values: a first value that represents the physical location and a second value that represents information about that physical location. The raster may cover an area of interest to help capture the scoring values on a map. Rasters may store both discrete and continuous data. Discrete data may include categorical data, where continuous data may not have clear boundaries, such as aerial image data. Each raster may relate to a specific type of data for a particular piece of land. In some embodiments, the rasters may be combined. Layering each raster may provide insight into a particular piece of land based on different project parameters. In some embodiments, the rasters may enable downstream analytics to calculate the land score. In some embodiments, the rasters may be used to calculate the land score. The land score calculator 152 may combine rasters generated by each of the characteristics over the piece of land being analyzed. This piece of land may also be known as an area of interest.

Each of the sub-scores 223 may be used together or separately with the land score calculator 152. The sub-scores 223 may be created using the land characteristics 222. For example, a land characteristic related to vegetation coverage may be used to determine a sub-score for vegetation removal by assessing for each unit area of land whether vegetation removal is necessary and the associated costs if vegetation removal is necessary. The sub-score may also consider the benefits associated with vegetation removal, such as the ability to sell timber that was cleared from the land, and other parameters, including but not limited to risk adjustment (i.e., taking into consideration what equipment may not be allowed for use in vegetation removal). In some embodiments, the sub-score 223 may be represented as a net present value. In some embodiments, each sub-score 223 may be stored as an attribute of a pixel. In some embodiments, the pixels for a specific portion of land may be aggregated to determine a sub-score 223 for a specific portion of land.

In some embodiments, the at least one sub-score 223 may be used in the land score calculator 152. A land score may be calculated using multiple sub-scores. When multiple sub-scores are used, each sub-score 223 may be identified using a raster with pixels that store the specific sub-score 223 for the specific portion of land. For each unit of land, the land score calculator 152 may aggregate the sub-scores for the unit of land and calculate the land score based on the aggregation.

In some embodiments, the land score calculator 152 may use a formula for calculating the land score. The formula may include an aggregation function of the different factors and scores to determine the final land score of a particular area of land. For example, the formula may be f(Energy score, pre-drill score, . . . ) with any of the relevant characteristics added into the formula as an f(x) equation. The function may produce a land score in terms of land per unit area or an economic value in terms of dollars.

In some embodiments, the location input 212 may be a vector dataset, representing the geometry of a location, and the location. The location may be input, as for example, geographic coordinates. In some embodiments, the location input 212 may be in the form of a shapefile, geodatabase, geoJSON, or a KMZ file. The project parameters 211 may include, but are not limited to, design capacity, design acreage, equipment, and weather information. Design capacity may be the power capacity of a power plant. Design acreage may be the amount of land needed to meet the design capacity for a project. Equipment may refer to panels, inverters, trackers, and any other equipment needed for a project.

The land score calculator 152 may be configured to run a simulation to simulate an arrangement of solar panels on the land plots or areas. The arrangement may be optimized for the arrangement of panels on that particular land plot. In some embodiments, the simulation, as part of the land score calculation, may be used to generate the web map 260. The web map 260 may be displayed on an interface, such as user interface 124. The web map 260 may contain the land areas, the amount of energy each area is expected to generate, an energy delta, and the land score calculation.

In some embodiments, the web map 260 may include land scores over different areas of land that are superimposed and combined to determine the land scores for different areas of land. The web map 260 may be generated based on the rasters. In some embodiments, images may be displayed on the map. In some embodiments, the map may be generated using GIS information. In some embodiments, a user may open a map using a browser or desktop software by clicking a link or an icon. In some embodiments, the map may be color coded. In some embodiments, the map may be a heat map. The web map 260 may be a raster image that contains pixels. Each pixel may include in its attributes the calculated land score for the correspondent unit area of the land.

Database 240 may be included on a volatile or non-volatile, magnetic, semiconductor, tape, optical, removable, non-removable, or other type of storage device or tangible or non-transitory computer-readable medium. Database 240 may include one or more memory devices that store data and instructions used to perform one or more features of the disclosed embodiments. Database 240 may include any suitable databases, ranging from small databases hosted on a work station to large databases distributed among data centers. Database 240 may also include any combination of one or more databases controlled by memory controller devices (e.g., server(s), etc.) or software. For example, database 240 may include document management systems, Microsoft SQL™ databases, SharePoint™ databases, Oracle™ databases, Sybase™ databases, other relational databases, or non-relational databases, such as MongoDB™ and others. Although one database 240 is shown in FIG. 2, the system may include one or more databases 240, which may be used to store various types of information associated with the system.

Figure 3:
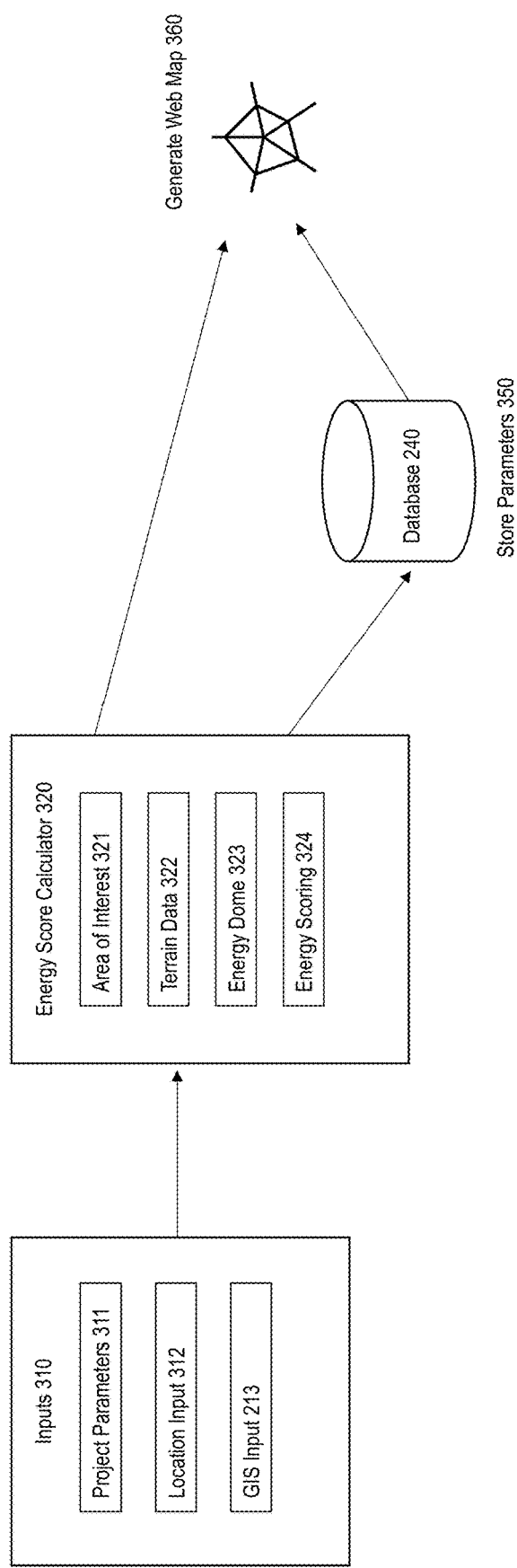
FIG. 3 is a block diagram of an energy scoring calculator, according to some embodiments of the present disclosure.

FIG. 3 is a block diagram of an energy scoring calculator 320, according to some embodiments of the present disclosure. The energy scoring calculator 320 may take inputs 310, such as a project parameters 311 and a location input 312. The energy scoring calculator 320 may be a part of the land score calculator 152. The calculation derived from the energy scoring calculator 320 may then be used to generate a web map 360. In the alternative, the energy scoring calculator 320 may store parameters 350, in a database, such as database 240, as discussed with respect to FIG. 2.

The project parameters 311 may include, but are not limited to, design capacity, design acreage, equipment, and weather information. Design capacity may be the power capacity of a power plant. Design acreage may be the amount of land needed to meet the design capacity for a project. Equipment may refer to panels, inverters, trackers, and any other equipment needed for a project.

The location input 312 may be input by a user on an aerial image, such as by the user 122 on a user interface, such as user interface 124, as described with respect to FIG. 1. The location input 312 may include one or more land plots or areas. In some embodiments, the location input 312 may be a vector dataset, representing the geometry of a location, and the location. The location may be input, as for example, geographic coordinates. In some embodiments, the location input 312 may be in the form of a shapefile, geodatabase, geoJSON, or a KMZ file.

The energy scoring calculator 320 may include an area of interest 321, terrain data 322, an energy dome 323, and an energy scoring component 324. The energy scoring calculator 320 may produce an energy score that uses the integration of terrain information, such as the terrain data 322 with analytical tools to determine an energy score calculation. The energy dome 323 may refer to a matrix of annual energy production as a function of a land slope and the direction of the slope. The land slope and direction of the slope may refer to axes on the matrix. The energy dome 323 may be a surface plot, with the slope and direction plotted on the axes. For example, if the plot is represented as a heatmap, the color intensity of the grid may refer to the annual energy production. In some embodiments, the energy scoring calculator 320 may use the energy dome 323 to develop a raster with regard to energy production to create a grid interpolation. Then, for the areas on a raster that do not have values, the energy scoring calculator 320 may use the rasters with values to create interpolated values for each point on an area of interest of the GIS layer. In some embodiments, the raster values may be normalized.

The energy scoring calculator 320 may be configured to run a simulation to simulate an energy score calculation for each location input. In some embodiments, the simulation, as part of the energy scoring calculation, may be used to generate the web map 360. The web map 360 may be displayed on an interface, such as user interface 124. The web map 360 may contain the energy score calculation. The web map 360 may be color coded with a legend to demonstrate the energy score. The web map 360 may be generated based on the rasters. In some embodiments, the web map 360 is generated using GIS information.

Figure 4:
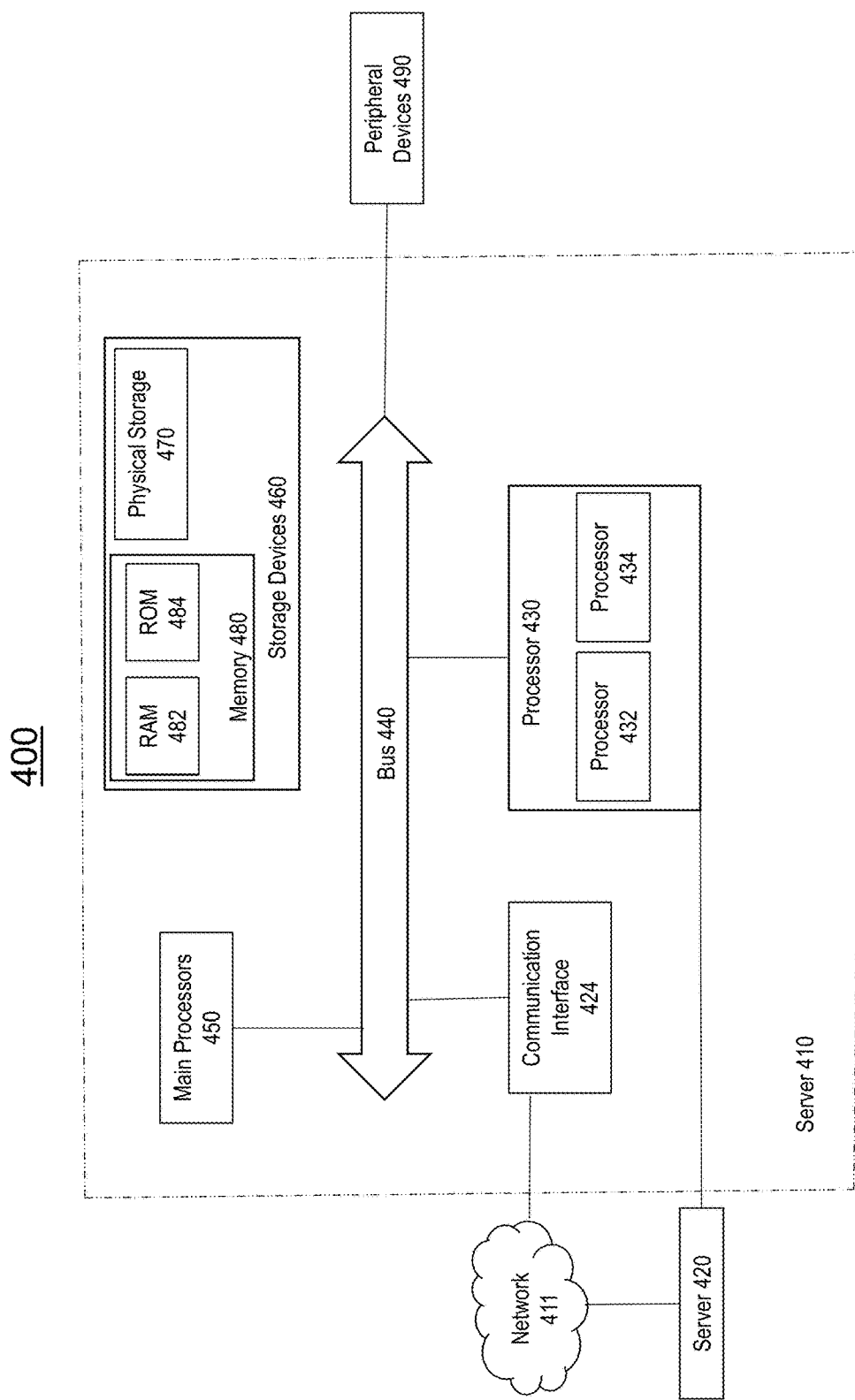
FIG. 4 is a schematic diagram of an exemplary server of a distributed system, according to some embodiments of the present disclosure.

FIG. 4 is a schematic diagram of an exemplary server of a distributed system, according to some embodiments of the present disclosure. According to FIG. 4, server 410 of distributed computing system 400 includes a bus 440 or other communication mechanisms for communicating information, one or more processors 430 communicatively coupled with bus 440 for processing information, and one or more main processors 450 communicatively coupled with bus 440 for processing information. Processors 430 may be, for example, one or more microprocessors. In some embodiments, one or more processors 430 includes processor 432 and processor 434, and processor 432 and processor 434 may be connected via an inter-chip interconnect of an interconnect topology. In some embodiments, processor 434 may be a dedicated hardware accelerator (such as a neural network processing unit) for processor 432. Main processors 450 may be, for example, central processing units ("CPUs").

Server 410 may transmit data to or communicate with another server 420 through a network 411. Network 411 may be a local network, an internet service provider, Internet, or any combination thereof. Communication interface 424 of server 410 is connected to network 411, which may enable communication with server 420. In addition, server 410 may be coupled via bus 440 to peripheral devices 490, which includes displays (e.g., cathode ray tube (CRT), liquid crystal display (LCD), touch screen, etc.) and input devices (e.g., keyboard, mouse, soft keypad, etc.).

Server 410 may be implemented using customized hard-wired logic, one or more ASICs or FPGAs, firmware, or program logic that in combination with the server causes server 410 to be a special-purpose machine.

Server 410 may further include storage devices 460, which may include memory 480 and physical storage 470 (e.g., hard drive, solid-state drive, etc.). Memory 480 may include random access memory (RAM) 482 and read-only memory (ROM) 484. Storage devices 460 may be communicatively coupled with processors 430 and main processors 450 via bus 440. Storage devices 460 may include a main memory, which may be used for storing temporary variables or other intermediate information during execution of instructions to be executed by processors 430 and main processors 450. Such instructions, after being stored in non-transitory storage media accessible to processors 430 and main processors 450, render server 410 into a special-purpose machine that is customized to perform operations specified in the instructions. The term "non-transitory media" as used herein refers to any non-transitory media storing data or instructions that cause a machine to operate in a specific fashion. Such non-transitory media may include non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, flash memory, register, cache, any other memory chip or cartridge, and networked versions of the same.

Various forms of media may be involved in carrying one or more sequences of one or more instructions to processors 430 or main processors 450 for execution. For example, the instructions may initially be carried out on a magnetic disk or solid-state drive of a remote computer. Bus 440 carries the data to the main memory within storage devices 460, from which processors 430 or main processors 450 retrieves and executes the instructions.

Scoring system 100 (as shown in FIG. 1) or one or more of its components may reside on either server 410 or 420 and may be executed by processors 430 or 450. In some embodiments, the components of scoring system 100 may be spread across multiple servers 420 and 410.

User device 120 may communicate with server 410 or 420 through networks 110 and 411. For example, user device 120 may transmit activity of user 122 to server 410 or 420. Server 410 or 420 may include any form of remote computing device configured to receive, store, and transmit data. For example, server 410 or 420 may be a server configured to store files accessible through a network (e.g., a web server, application server, virtualized server, etc.). Server 410 or 420 may be implemented as a Software as a Service (SaaS) platform through which software for auditing recorded user activity may be provided to an organization as a web-based service.

Figure 5:
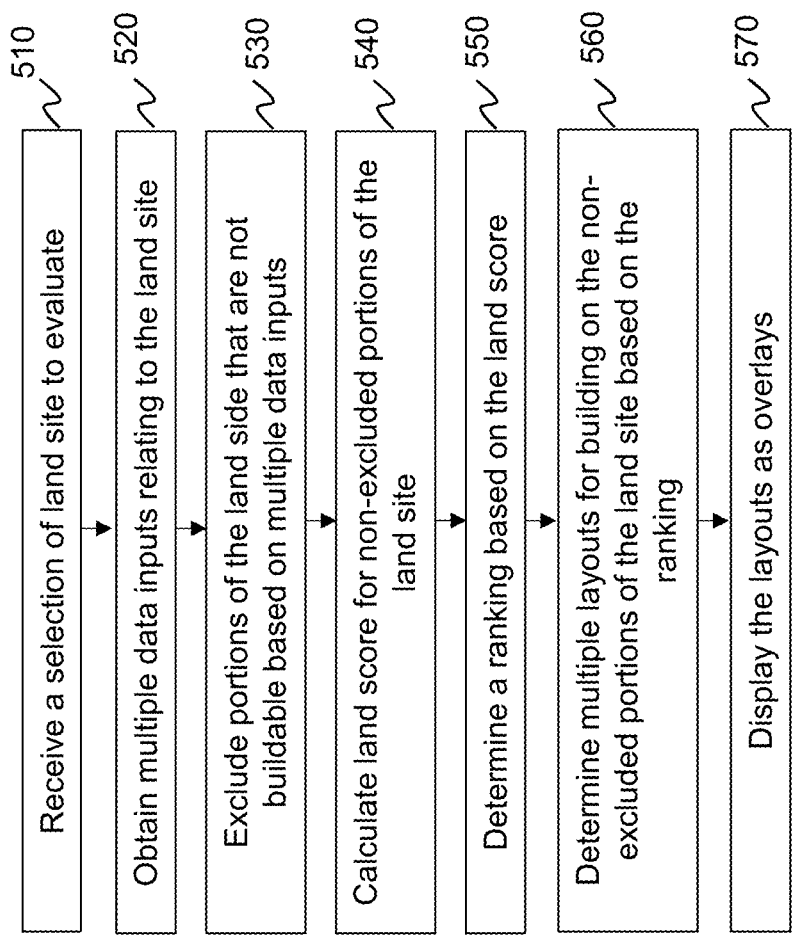
FIG. 5 is a flowchart of an exemplary method for providing a land score calculation, according to some embodiments of the present disclosure.

FIG. 5 is a flowchart of an exemplary process 500 for generating at least one land score, according to some embodiments of the present disclosure.

In step 510, process 500 may receive, from a user via a graphical user interface (GUI), a selection of a land site to evaluate. In some embodiments, a user may be a stakeholder as described herein. In some embodiments, the selection of a land site to evaluate may be based on any of the factors described herein. In some embodiments, the user may interact with the GUI to determine what land site to evaluate. For example, the user may make a selection on the GUI for a specific land site. In some embodiments, a user may draw a selection on the GUI for a specific land site. In some embodiments, a user may select a specific land site from a dropdown menu.

In step 520, process 500 may obtain multiple data inputs relating to the selected land site, wherein the selected land site includes at least one unit of land. In some embodiments, the data inputs may be those as described with respect to any of FIGS. 2-3. In some embodiments, the multiple data inputs may be automatically input by process 500. In other embodiments, a user may enter the multiple data inputs via the graphical user interface. In some embodiments, the land site may include more than one unit of land. In some embodiments, a unit of land may be determined by pixels, as described herein. In some embodiments, the multiple data inputs may include aerial imagery of the land site. In some embodiments, aerial imagery may include photographs or videos from an aircraft or other airborne platforms. In some embodiments, the multiple data inputs may include at least geospatial information systems (GIS) rasters of the land site. In some embodiments, the GIS rasters may include pixels of the land site. In some embodiments, the pixels may vary in size based on at least one of a land characteristic or a resolution of analysis. A land characteristic may be any land characteristic as described herein. In some embodiments, resolution of analysis may refer to ground resolution or spatial resolution represented in a single pixel on a screen. In some embodiments, the single pixel may be stored in memory as part of a digital raster file. In some embodiments, the resolution of the pixel, and thus the resolution of analysis, may be defined by physical dimensions related to the pixel. In some embodiments, the physical dimensions may be stored as metadata of the raster in memory. In some embodiments, the physical dimensions may be linear. In other embodiments, the physical dimensions may be geographic. In some embodiments, the physical dimensions of the pixel may represent the size and shape of the pixel in a physical shape, such as a land site. In some embodiments, the multiple data inputs may include any of the data inputs as described herein. In some embodiments, the multiple data inputs may be pre-processed using at least one algorithm.

In step 530, process 500 may exclude portions of the land site that are not buildable based on the multiple data inputs. For example, process 500 may exclude a portion of the land because there is vegetation that may not be removed, an endangered or protected species lives on the land, or because the structural integrity of the land could not support solar panels.

In step 540, process 500 may calculate the at least one land score for non-excluded portions of the land site based on the multiple data inputs, as described with respect to FIG. 2. In some embodiments, the land score may be based on a layout score for each layout associated with process 500. In some embodiments, the land score may be based on a constraint criterion. A constraint criterion may refer to any constraint relevant to process 600. In some embodiments, a constraint criterion may specify permissible attribute configurations or features to ensure that specific conditions are met when calculating the land score. For example, constraints may be related to potential costs, particular environmental factors, return on investment, or any other consideration relevant to the user. In some embodiments, the land score for the selected unit of land may be stored in a database. In some embodiments, the land score may be calculated based on at least one sub-score, as described with respect to FIGS. 2-3. In some embodiments, each sub-score may be represented by at least one GIS raster.

In step 550, process 500 may determine, based on the at least one land score, a ranking for the at least one unit of land based on the at least one land score. In some embodiments, the ranking may be a calculation that determines a ranking among different units of land based on the calculation of the at least one land score. In other embodiments, the ranking may be a binary determination of yes or no based on the at least one land score. In some embodiments, process 500 may further determine a recommended viable building area based on the land score and adjacent points on the layouts. In some embodiments, the recommended viable building area may be based on geospatial features that represent a location excluded from the layouts. Geospatial features may include time-based data for a specific unit or area of land. Geospatial features may include vector data, such as points, lines, and polygons to represent features such as properties, cities, roads, mountains, and bodies of water. Geospatial features may also include raster data.

In step 560, process 500 may determine multiple layouts for building on the non-excluded portions of the land site based on the ranking. In some embodiments, a user may interact with the system of process 500. For example, a user may draw on the multiple layouts via the graphical user interface. In another example, a user may move a shape on the application from a first location to a second location. After the shape is moved to the second location, the map may be dynamically updated to include information for the second location. The user may also change the perspective of the layouts, may change the multiple data inputs to update the layouts, and may interact with the system to update the layouts. In some embodiments, process 500 may iteratively update the multiple layouts based on updated multiple data inputs. In some embodiments, process 500 may recommend a layout for the user based on the iterative updates and the multiple data inputs. In some embodiments, process 500 may determine an optimal layout for the user based on the multiple data inputs. In some embodiments, determining an optimal layout may be based on the ranking. In some embodiments, the multiple layouts may be updated based on iterations of updating and adjusting the data inputs using an algorithm. In some embodiments, such iteration may affect the determination of an optimal layout. In some embodiments, updating may occur based on rules or behaviors associated with the layouts. In some embodiments, an optimal layout may be chosen to create different or new optimal layouts based on, for example, updated input data. In some embodiments, the iterations may continue until a project is set to begin.

In step 570, process 500 may display the layouts of the non-excluded portions as overlays on the land site via the GUI. In some embodiments, the display may occur automatically. In some embodiments, the display may include a map with layout geometries and land score rasters. In some information, the display may publish to a mapping and analysis solution, such as ArcGIS Online. A user may access the information by signing into the mapping and analysis solution, via for example, a username and password. In some embodiments, the layouts may be displayed dynamically. In some embodiments, the display may update based on additional user input. In some embodiments, the layouts may overlap with one another. In some embodiments, displaying the layouts includes visual differentiation between the layouts based on the ranking of the layouts. For example, the visual differentiation may include words or text that indicates the ranking of the layouts, such as layout 1, layout 2, layout 3, etc. The visual differentiation may be a color scheme that indicates the ranking of the layouts. In some embodiments, the visual differentiation may use different variables. For example, visual differentiation may occur based on location, size, shape, orientation, focus, arrangement, texture, saturation, hue, or value. In some embodiments, displaying the layouts may include layout schemes for solar panels for the land site. In some embodiments, the layout scheme may also include at least one of solar panels, inverter blocks, racking equipment, performance monitoring equipment, energy storage system, or any other equipment related to solar panels.

In some embodiments, the display may be updated based on a determination that the land score should be recalculated. In some embodiments, determining the land score should be recalculated may be determined by the user. In some embodiments, determining the land score should be recalculated may be determined by process 500 based on a determination that one or more of the multiple data inputs has changed. In some embodiments, the display may be updated based on a determination that at least one of the multiple data inputs was updated. In some embodiments, the display may be updated based on changes to the selected unit of land over a predetermined period of time.

In some embodiments, the multiple layouts may be assessed based on the expected performance of each layout. In some embodiments, the performance may be based on the amount of energy a particular layout is expected to produce. In some embodiments, the multiple layouts may be further assessed based on operational costs. In some embodiments, an algorithm, as discussed previously, may be used to determine which layout is an optimal layout among the multiple layouts.

Figure 6A:
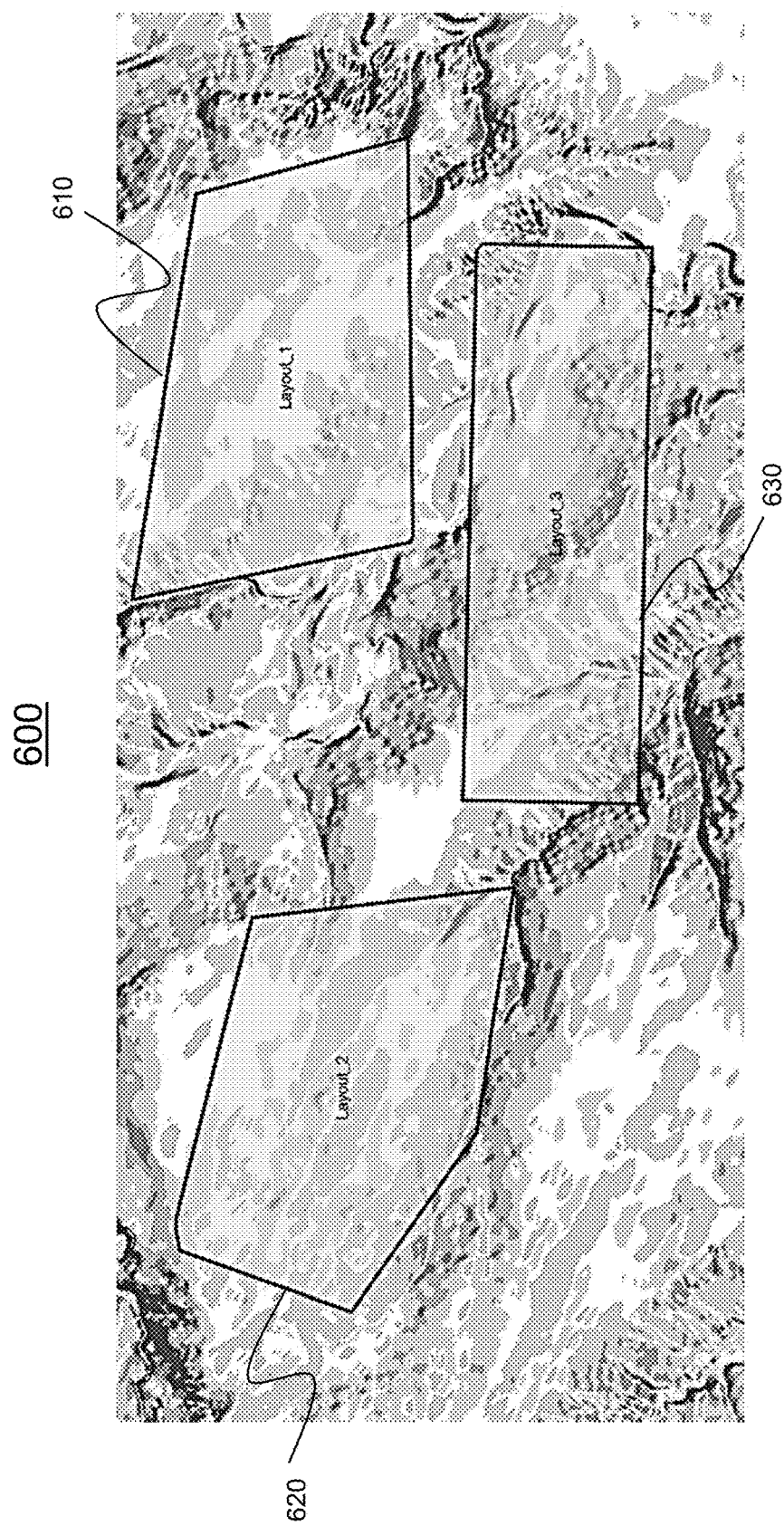
FIG. 6A is an exemplary display, according to some embodiments of the present disclosure.

FIG. 6A is an exemplary display, according to some embodiments of the present disclosure. Display 600 is an exemplary display output on a graphical user interface. As shown in FIG. 6A, a map may be displayed with different layouts. Layout 610 (layout 1), layout 620 (layout 2), and layout 630 (layout 3) may be displayed as overlays on the land site via the graphical user interface, as described with respect to FIG. 5. It is to be understood that FIG. 6A is merely exemplary and that there is no limit to the number of layouts or how the layouts may be displayed.

Figure 6B:
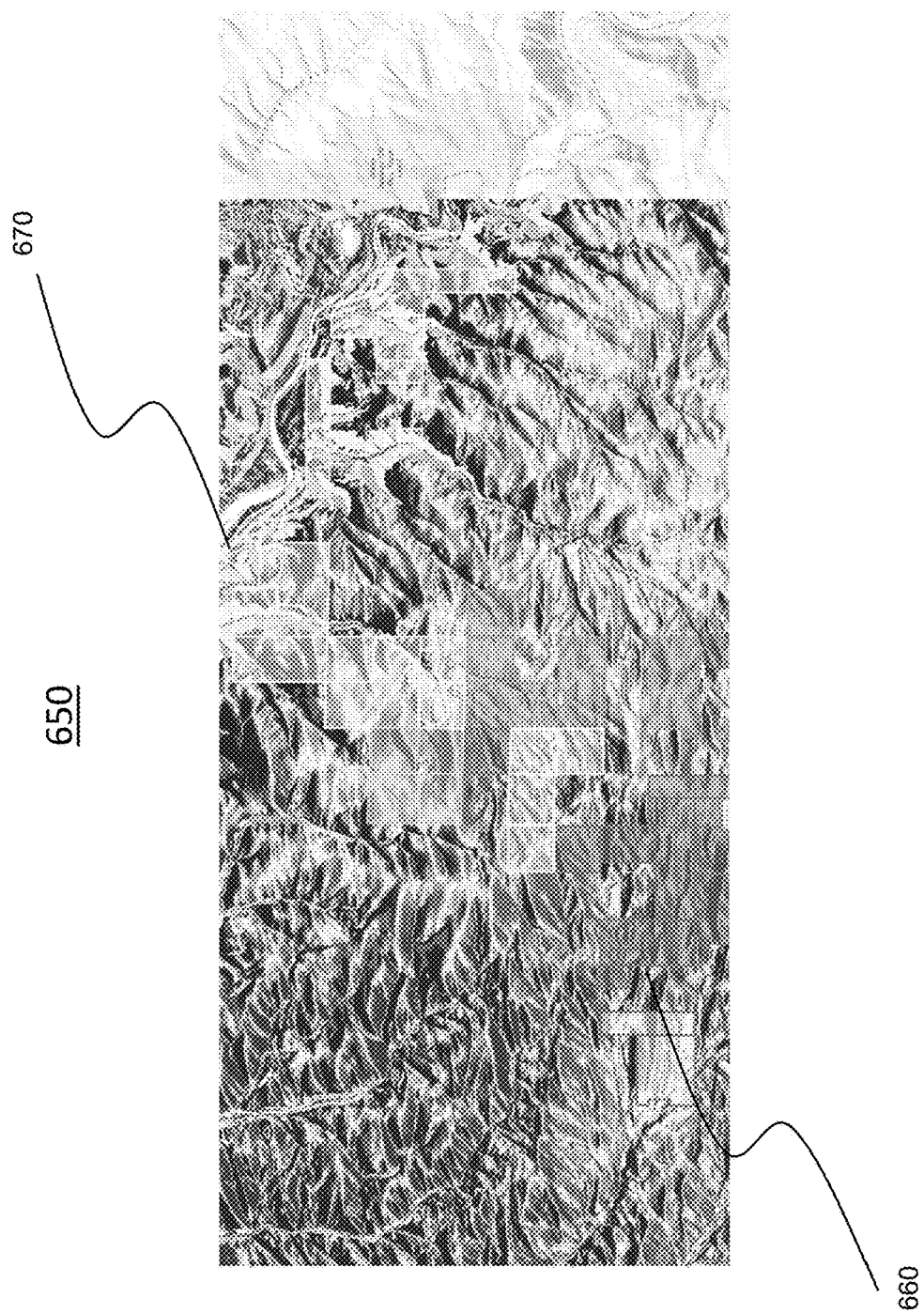
FIG. 6B is an exemplary display, according to some embodiments of the present disclosure.

FIG. 6B is an exemplary display, according to some embodiments of the present disclosure. Display 650 is an exemplary display output on a graphical user interface. As shown in FIG. 6B, display 650 may display a results view based on the calculation of the land scoring, consistent with disclosed embodiments. In some embodiments, the display area of 660 of the map may represent areas with a higher land score, and thus may represent optimal layouts, while display area 670 may represent areas with a lower land score, and thus less optimal layouts. In some embodiments, a user may customize the display 650 based on the layers that are selected for calculating the land score, consistent with disclosed embodiments. In some embodiments, the display 650 may have a basemap that displays, for example, terrain, roads, and satellite information for a land site. In some embodiments, the user may determine additional layers for any of the geospatial inputs that are used to calculate the land score. In some embodiments, the additional layer may be an energy scoring raster that determines the potential energy production for a unit of land.

Figure 7:
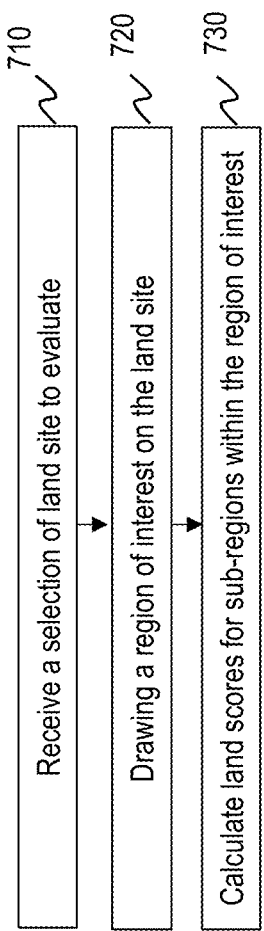
FIG. 7 is a flowchart of an exemplary process for drawing regions of interest for a land site, according to some embodiments of the present disclosure.

FIG. 7 is a flowchart of an exemplary process 700 for drawing regions of interest for a land site, according to some embodiments of the present disclosure.

In step 710, process 700 may receive, from a user via a graphical user interface (GUI), a selection of a land site to evaluate. In some embodiments, a user may be a stakeholder as described herein. In some embodiments, the selection of a land site to evaluate may be based on any of the factors described herein. In some embodiments, the user may interact with the GUI to determine what land site to evaluate. For example, the user may make a selection on the GUI for a specific land site.

In step 720, process 700 may draw a region of interest on the land site. In some embodiments, process 700 may receive an interaction from the user via the GUI to draw a region of interest on the land site. In some embodiments, the user may draw multiple regions of interest on the GUI based on the land site or certain parameters, consistent with disclosed embodiments.

In step 730, process 700 may calculate land scores for sub-regions within the region of interest. In some embodiments, a user may draw sub-regions within the region of interest. In other embodiments, a land score may be automatically calculated based on the drawn region of interest on the land site.

In this document, the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog or digital components that are, for example, integrated as part of a printed circuit board. Alternatively, or additionally, the disclosed components or modules may be implemented as an Application Specific Integrated Circuit (ASIC) or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware, or firmware. The connectivity between the modules or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C.

What is claimed is:

1. A data processing system for generating a land score, the system comprising:
    a memory storing a set of instructions; and
    one or more processors configured to execute the set of instructions to cause the data processing system to perform operations comprising:
        receiving, from a user via a graphical user interface (GUI), a selection of a land site to evaluate, wherein the land site includes at least one unit of land;
        obtaining multiple data inputs relating to the land site from at least one of a public geospatial information system (GIS) database, proprietary vendor dataset, geological survey, LiDAR point cloud dataset, satellite imagery repository, or on-site geotechnical survey, the multiple data inputs including an energy production estimate for the land site and land costs associated with the land site, wherein the multiple data inputs comprise GIS raster datasets having multiple pixel values representing physical land characteristics, each pixel having a first value representing a geospatial location and a second value representing a measured or derived characteristic of that location;
        automatically pre-processing the multiple data inputs to a common coordinate reference system and resolution, including at least one of resampling raster data, correcting geometry, or normalizing pixel values;
        excluding portions of the land site that are not buildable based on the multiple data inputs;
        calculating a plurality of sub-scores for the non-excluded portions of the land site based on the multiple data inputs, the plurality of sub-scores including an energy production sub-score and a land cost sub-score, wherein calculating comprises applying computerized geospatial analysis to pixel values of the GIS raster datasets;

calculating the land score for non-excluded portions of the land site based on the multiple data inputs and the plurality of sub-scores;

determining, based on the land score, a ranking for the at least one unit of land based on the land score;

generating a recommendation to construct a renewable energy project on the land site based on the ranking;

determining multiple layouts for inverter blocks of the renewable energy project for building on the non-excluded portions of the land site based on the ranking;

evaluating the multiple layouts using a fitness function that compares the energy production and costs of the multiple layouts; and based on the evaluations of the multiple layouts,
generating a recommendation for a layout of the multiple layouts for constructing the renewable energy project on the land site and dynamically displaying the layouts as geospatial overlays on a digital map of the land site via the GUI in response to updated multiple data inputs, wherein the overlays are rendered in coordination with the underlying pixel-based land score raster for interactive user analysis.

2. The system of claim 1, wherein the operations further comprise:

displaying the multiple layouts as overlays on the land site via the GUI, the GUI including visual differentiation between the layouts based on the ranking of the layouts.

3. The system of claim 2, wherein displaying the layouts further comprises displaying the multiple layouts for the inverter blocks for the land site.

4. The system of claim 1, wherein the multiple data inputs includes aerial imagery of the land site.

5. The system of claim 1, wherein the multiple data inputs includes geospatial information systems (GIS) rasters of the land site.

6. The system of claim 5, wherein the GIS rasters include pixels of the land site, wherein the pixels vary in size based on at least one of a land characteristic or a resolution of analysis.

7. The system of claim 1, wherein the operations further comprise an interactive use of the system, wherein the user may draw on the layouts.

8. The system of claim 1, wherein the operations further comprise determining a recommended viable building area based on the land score and adjacent points on the layouts.

9. The system of claim 1, wherein the operations further comprise determining a recommended viable building area based on geospatial features that represent a location excluded from the layouts.

10. The system of claim 1, wherein the land score is further based on at least one constraint criterion, wherein the constraint criterion includes at least one of a cost factor or an environmental factor.

11. The system of claim 1, wherein the display is updated based on a determination that the land score is to be recalculated or at least one of the multiple data inputs is updated.

12. The system of claim 1, wherein the display is updated based on changes to the selected unit of land over a predetermined period of time.

13. The system of claim 1, wherein the land score for the selected unit of land is stored in a database and displaying the land score comprises accessing the database.

14. The system of claim 1, wherein the system:
iteratively updates the multiple layouts based on updated multiple data inputs.

15. The system of claim 1, wherein the multiple data inputs include at least one of: amount of depth to bedrock, a flood hazard, wetland information, hydrography information, a slope, transmission infrastructure, distribution infrastructure, weather data, soil characteristics, transportation infrastructure, residential real estate infrastructure, commercial real estate infrastructure, vegetation surveys, environmental surveys, or wildlife habitats.

16. The system of claim 1, wherein each sub-score is represented by at least one GIS raster.

17. The system of claim 1, wherein the operations further comprise pre-processing the multiple data inputs using at least one algorithm.

18. A non-transitory computer-readable medium including instructions that, when executed by at least one processor, cause the at least one processor to perform operations for generating a land score, the operations comprising:

receiving, from a user via a graphical user interface (GUI), a selection of a land site to evaluate, wherein the land site includes at least one unit of land;

obtaining multiple data inputs relating to the land site including an energy production estimate for the land site and land costs associated with the land site, wherein the multiple data inputs comprise geospatial information system (GIS) raster datasets having multiple pixel values representing physical land characteristics;

automatically pre-processing the multiple data inputs to a common coordinate reference system and resolution, including at least one of resampling raster data, correcting geometry, or normalizing pixel values;

excluding portions of the land site that are not buildable based on the multiple data inputs;

calculating a plurality of sub-scores for the non-excluded portions of the land site based on the multiple data inputs, the plurality of sub-scores including an energy production sub- score and a land cost sub-score, wherein calculating comprises applying computerized geospatial analysis to pixel values of the GIS raster datasets;

calculating the land score for non-excluded portions of the land site based on the multiple data inputs and the plurality of sub-scores;

determining, based on the land score, a ranking for the at least one unit of land based on the land score;

generating a recommendation to construct a renewable energy project on the land site based on the ranking;

determining multiple layouts for inverter blocks of the renewable energy project for building on the non-excluded portions of the land site based on the ranking;

evaluating the multiple layouts using a fitness function that compares the energy production and costs of the multiple layouts; and based on the evaluations of the multiple layouts, generating a recommendation for a layout of the multiple layouts for constructing the renewable energy project on the land site and dynamically displaying the layouts as geospatial overlays on a digital map of the land site via the GUI in response to updated multiple data inputs.

19. A computer-implemented method data for generating a land score, the method comprising:

receiving, from a user via a graphical user interface (GUI), a selection of a land site to evaluate, wherein the land site includes at least one unit of land;

obtaining multiple data inputs relating to the land site including an energy production estimate for the land site and land costs associated with the land site, wherein the multiple data inputs comprise geospatial information system (GIS) raster datasets having multiple pixel values representing physical land characteristics;

automatically pre-processing the multiple data inputs to a common coordinate reference system and resolution, including at least one of resampling raster data, correcting geometry, or normalizing pixel values;

excluding portions of the land site that are not buildable based on the multiple data inputs;

calculating a plurality of sub-scores for the non-excluded portions of the land site based on the multiple data inputs, the plurality of sub-scores including an energy production sub-score and a land cost sub-score, wherein calculating comprises applying computerized geospatial analysis to pixel values of the GIS raster datasets;

calculating the land score for non-excluded portions of the land site based on the multiple data inputs and the plurality of sub-scores;

determining, based on the land score, a ranking for the at least one unit of land based on the land score;

generating a recommendation to construct a renewable energy project on the land site based on the ranking;

determining multiple layouts for inverter blocks of the renewable energy project for building on the non-excluded portions of the land site based on the ranking;

evaluating the multiple layouts using a fitness function that compares the energy production and costs of the multiple layouts; and based on the evaluations of the multiple layouts, generating a recommendation for a layout of the multiple layouts for constructing the renewable energy project on the land site and dynamically displaying the layouts as geospatial overlays on a digital map of the land site via the GUI in response to updated multiple data inputs.

\* \* \* \* \*